(12) United States Patent
Jiang

(10) Patent No.: US 6,325,167 B1
(45) Date of Patent: Dec. 4, 2001

(54) STRUCTURE OF AN ELECTRICAL WHEELCHAIR

(76) Inventor: Ming-Shyang Jiang, P.O. Box 82-144, Taipei (TW)

( * ) Notice: Subject to any disclaimer, the term of this patent is extended or adjusted under 35 U.S.C. 154(b) by 0 days.

(21) Appl. No.: 09/635,838

(22) Filed: Aug. 11, 2000

(30) Foreign Application Priority Data

Jun. 14, 1999 (TW) ............................................. 88209794 U

(51) Int. Cl.[7] ...................................................... A61G 5/04
(52) U.S. Cl. .................. 180/9.32; 180/907; 180/9.46; 280/DIG. 10; 280/5.22
(58) Field of Search ............................. 114/194; 180/907, 180/9.1, 9.22, 9.32, 9.46; 280/304.1, DIG. 10, 6.154, 6.15, 6.153, 250.1, 5.2, 5.22, 5.32

(56) References Cited

U.S. PATENT DOCUMENTS

| | | | | |
|---|---|---|---|---|
| 4,222,449 | * | 9/1980 | Feliz | 180/8 A |
| 4,566,551 | * | 1/1986 | Feliz | 180/9.1 |
| 4,618,155 | * | 10/1986 | Jayne | 280/5.28 |
| 4,647,053 | * | 3/1987 | Kanno | 280/6 R |
| 4,688,813 | * | 8/1987 | Misawa et al. | 280/5.22 |
| 4,790,548 | * | 12/1988 | Decelles et al. | 280/5.26 |
| 5,437,467 | * | 8/1995 | Patin | 280/112.2 |
| 6,158,539 | * | 12/2000 | Isley | 180/89.14 |

FOREIGN PATENT DOCUMENTS 52-44933 * 4/1977 (JP) ....................................... 180/8.2

* cited by examiner

Primary Examiner—Paul N. Dickson
Assistant Examiner—Avraham H. Lerner
(74) Attorney, Agent, or Firm—A & J

(57) ABSTRACT

An improved structure of a wheelchair includes a seat, a to-and-fro adjusting member, a left-and-right adjusting member, a bottom frame body, a wheel belt module, a vertical sensor, and a retractable leakage prevention cover, wherein the seat is provided with a driving-controlled rod mounted at one lateral side of the handrail of the wheelchair for the user to control in moving to-and-fro. The wheelchair is maintained at a horizontal position during the climbing up or moving down a bumpy road or a plurality of steps. Thus, a user sitting on the seat will keep comfortably in a horizontal position.

5 Claims, 10 Drawing Sheets

STRUCTURE OF AN ELECTRICAL WHEELCHAIR

BACKGROUND OF THE INVENTION (a) Technical Field of the Invention

The present invention relates to an electrical wheelchair, and in particular, to an improved structure of an electrical wheelchair which has a simple structure and can be used to climb or down a plurality of steps or on a bumpy road. The wheelchair can move in a stable and horizontal position and provides great comfort to the user.

(b) Brief Description of the Prior Art

Conventional wheelchairs are normally unable to climb up or down a plurality of steps or moves stably and horizontally along a bumpy road. In other words, most of the wheelchairs can only be usefil when the ground is flat without obstacles to the path of the wheelchairs.

In view of the above drawback, it is the main object of the present invention to provide an automatic controlled wheelchair which can move on a bumpy ground and keep horizontal when it climbs up or down a plurality of steps.

SUMMARY OF THE INVENTION

An aspect of the present invention is to provide an improved structure of an electrical wheelchair, wherein the structure of the wheelchair is simple and can automatically control the seat in a horizontal position.

Yet another object of the present invention is to provide an improved structure of an electrical wheelchair, wherein the wheelchair can move in almost all horizontal-directions.

It is another object of the present invention to provide an improved structure of an electrical wheelchair, wherein the user on the seat can be comfortably transported.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
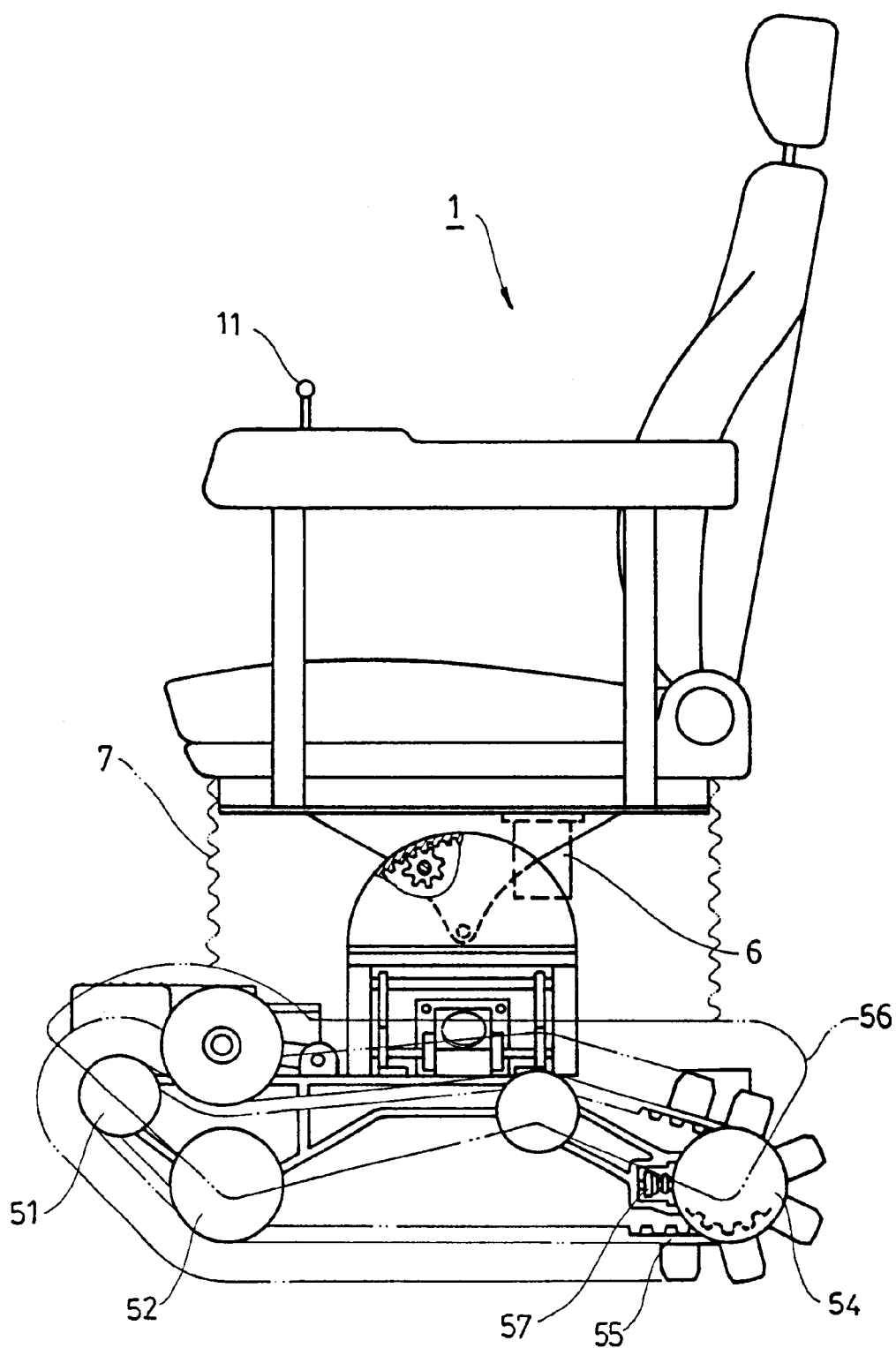
FIG. 1 is a sectional view of the improved structure of an electrical wheelchair in accordance with the present invention.
Figure 2:
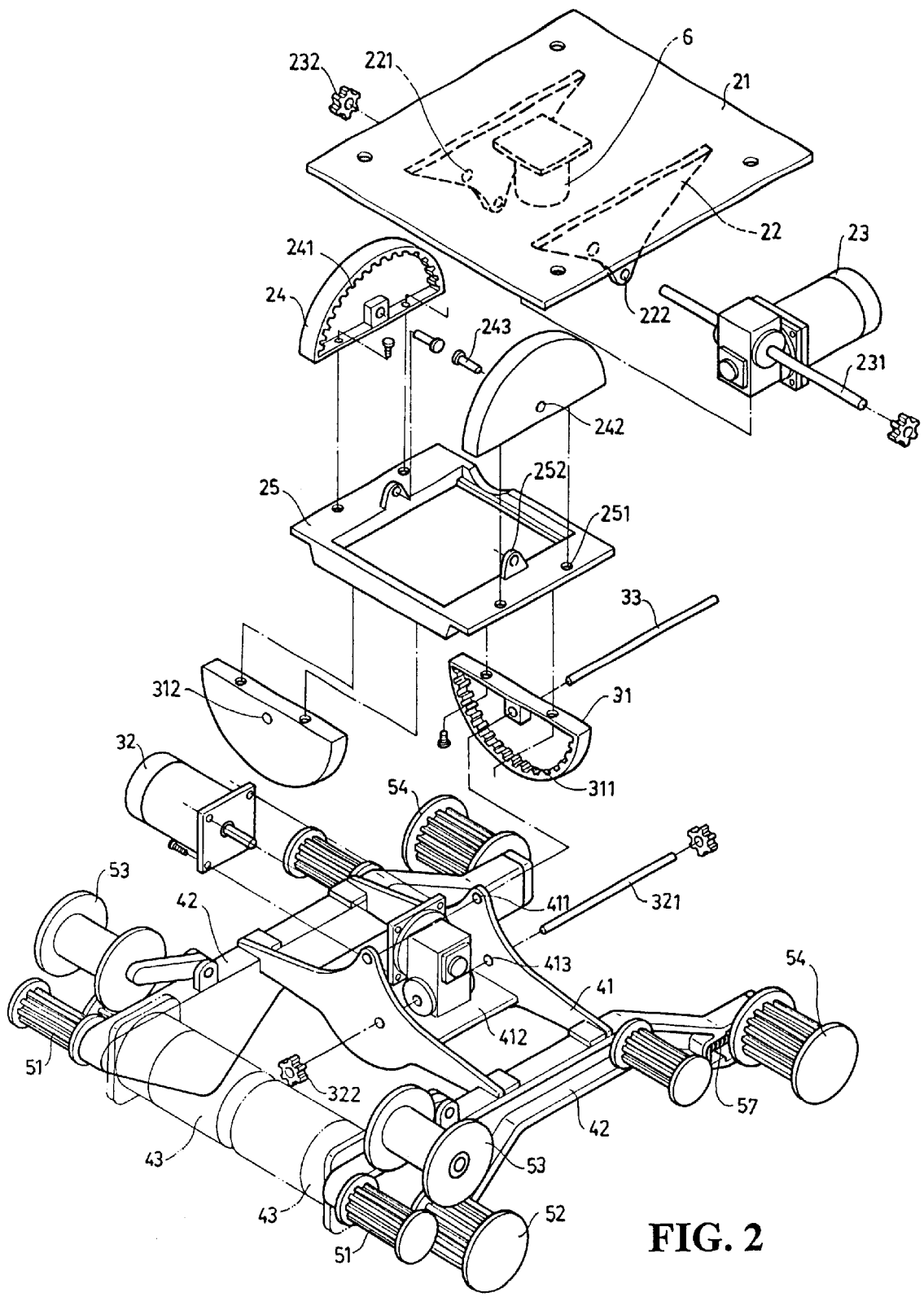
FIG. 2 is a perspective exploded view of the to-and-fro, left-and right adjusting member, bottom frame body, roller belt module, and vertical sensor of an improved structure of an electrical wheelchair in accordance with the present invention.
Figure 3:
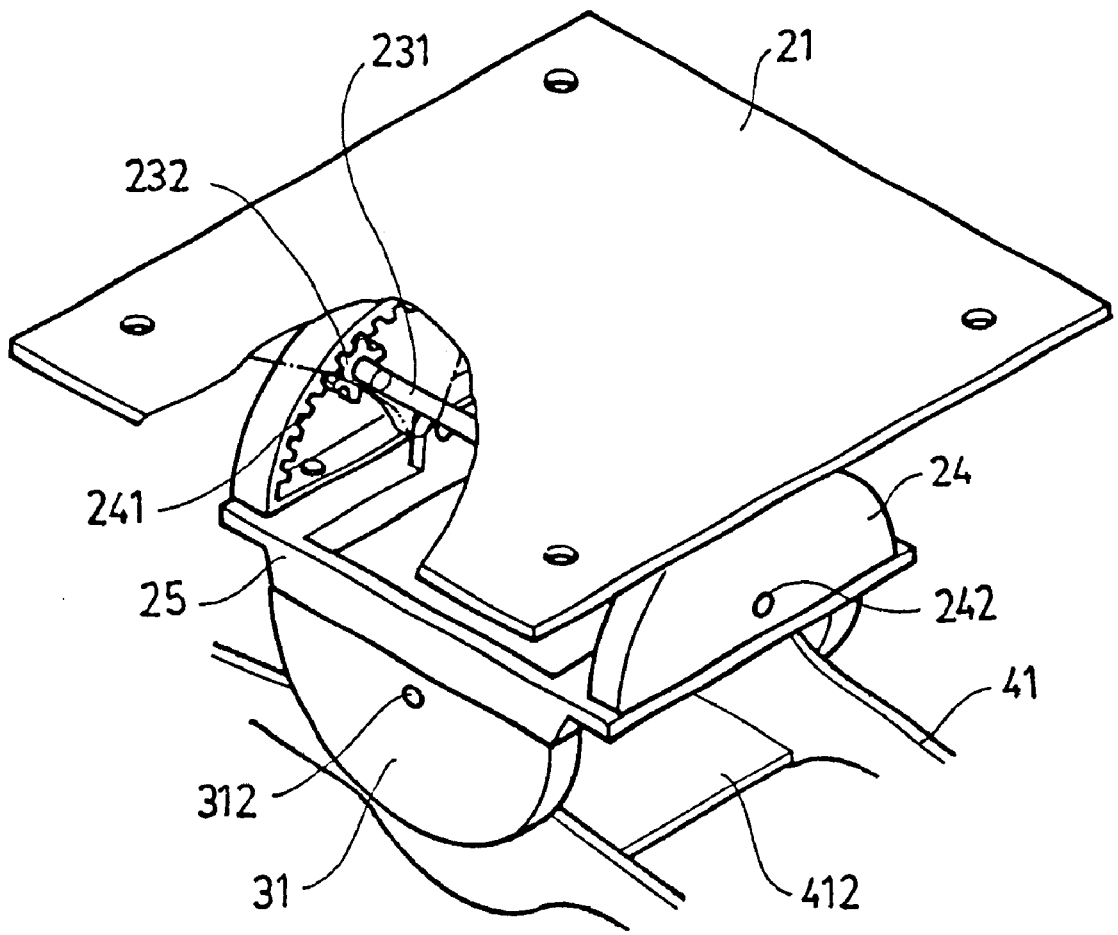
FIG. 3 is a perspective view of the to-and-fro, left-and-right adjusting member mounted at the bottom of the bottom middle frame of the improved structure of an electrical wheelchair in accordance with the present invention.

Referring to the drawings and initially to FIGS. 1 to 6, there is shown an improved structure of a wheelchair comprising a seat 1, a to-and-fro adjusting member 2, a left-and-right adjusting member 3, a bottom frame body 4, a wheel belt module 5, a vertical sensor 6, and a retractable leakage prevention cover 7, wherein the seat 1 is provided with a driving-controlled rod 11 mounted at one lateral side of the handrail of the wheelchair for the user to control in moving to-and-fro. The bottom face of the seat is mounted with a support platform 21 (as shown in FIGS. 2 & 3) of the to-and-fro adjusting member 2 using a plurality of screw bolts.

The to-and-fro adjusting device 2 is provided with the supporting platform 21 mounted at the bottom section of the seat 1, and the platform 21 is secured using screw bolts. A pair of reverse triangular shaped directing boards 22 are protruded from the bottom of the platform 21 having a hole 221 for the transmission shaft 231 of a speed-reducing motor 23 to pass through. The two ends of the shaft 231 is mounted with a rotating small gear 232 corresponding to a semi-circular rotating inner gear seats 24 and in engagement with the gear body 241 within the seat. The center of the gear seat 24 is provided with a shaft hole 242 corresponding to two protruded lugs 252 of a frame seat 25 for the mounting of a bolt 243 such that the two directing boards 22 and the gear seats 24 are interconnected. The bottom section of the directing inner gear seat 24 is mounted at the two lateral sides of the frame seat 25 by screws. Thus, when the speed-reducing is activated, the transmission shaft 231 will drive the two rotating small gear 232 to respectively rotate the gear body 241 to move to-and-fro, and the seat 1 at the top of the supporting platform 21 to move synchronously. The frame seat 25 is a hollow frame having the lateral sides of the top surface being a plurality of holes for the securing of the inner gear seat 24. The shaft hole 242 at the inner gear seat 24 is provided with a protruded lug 252 corresponding to the shaft hole 24 and the hole 222 so that the shaft bolt 243 can rotatably mounted. The bottom face of the other lateral side of the frame seat 25 is provided with a plurality of holes for the securing of the inner gear seat 31 of the left-and-right adjusting member 3 by screw bolts.

The left-right adjusting member 3 is provided with a pair of corresponding inner gear seats 31 and a speed-reducing motor 32. The center region of the inner gear seat 31 is a shaft hole 312 corresponding to a rotating hole 411 located at the H-shaped bottom middle-frame 41 for the insertion of a shaft rod 33 such that the inner gear seat 31 is located at the external face at the top of the bottom middle-frame 41, and the speed-reducing motor 32 is located at the bottom board 412 of the bottom middle frame 41, and the two lateral ends of the transmission shaft rod 321 is corresponding to the hole 413 of the two lateral sides of the bottom middle-frame 41, and the two ends being connected to another rotating small gear 322 which is in engagement with the gear body 311 of the inner gear seat 31. Thus, when the speed-reducing motor 32 drives the shaft rod 321 to rotate, the two rotating small gears 322 respectively rotate the gearbody 311 at the inner gear seat 31, and the inner gear seat 31 moves in a left-and-right direction and the to-and-fro adjusting member 2 and the seat 1 will move synchronously. The bottom middle frame 41 and the bottom frame body 4 are formed integrally as a unit.

The base frame body 4 for the supporting of the weight of the wheelchair is provided with a center extended with the bottom middle-frame 41, and the inner face corresponding to the two lateral side frames 42 is provided with a driving motor 43, and the external lateral face is connected to a wheel belt module 5 and the transmission shaft 33 of the driving motor 43 is respectively passed through the lateral side frame 42 and connected to a transmission wheel 51.

The wheel belt module 5 comprises of the transmission wheel 51, a step-wheel 52, a press-stopping wheel 53, and a landing wheel 54, and a belt 55 and a covering plate 56 (as shown in FIGS. 1 & 2). The transmission wheel 51 is being driven by the transmission shaft of the driving motor 43 so as to drive the entire wheel belt module 5, and the step wheel 52 is located at the side of the transmission wheel 51 for the climbing of a plurality of steps, and the press-stopping wheel 53 is located at the side of the transmission wheel 51 for the stopping of the belt 55, and the inner side of the landing wheel 54 is the adjusting member 57 to drive the displacement of the landing wheel 54 so that the tightness of the belt 55 can be adjusted, and the surface of the belt 55 is provided with teeth face of appropriate width to facilitate the climbing of steps or bumpy road, and the cover plate 56 is used to prevent the polluted water or stone or dust to collect on the seat 1.

Figure 4:
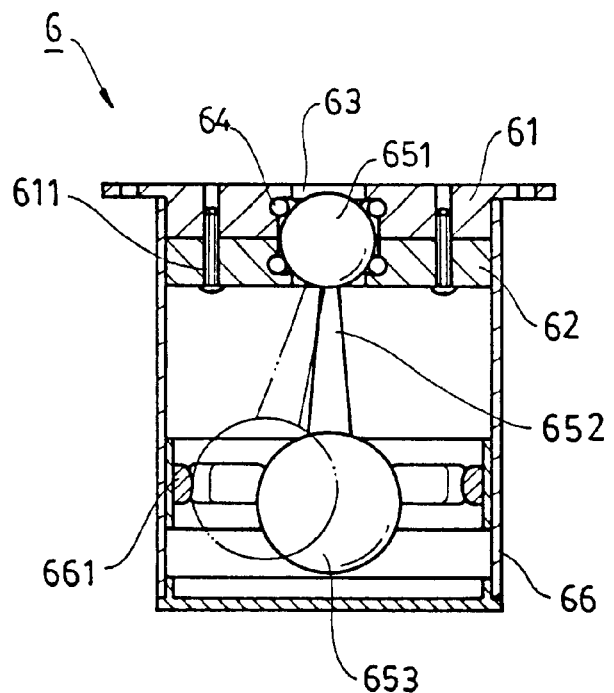
FIG. 4 is a sectional view of a vertical sensor of the improved structure of an electrical wheelchair in accordance with the present invention.
Figure 5:
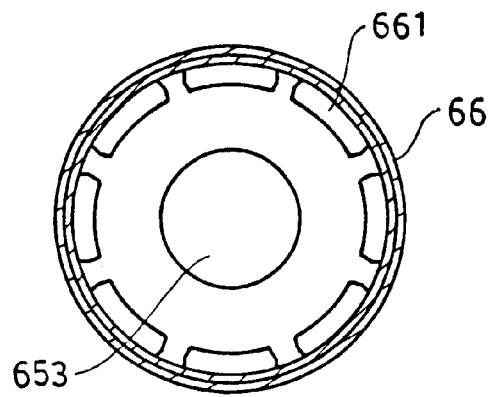
FIG. 5 is a schematic combination view of the impact conductor and the carbon conductor of the vertical sensor of the improved structure of an electrical wheelchair in accordance with the present invention.
Figure 6:
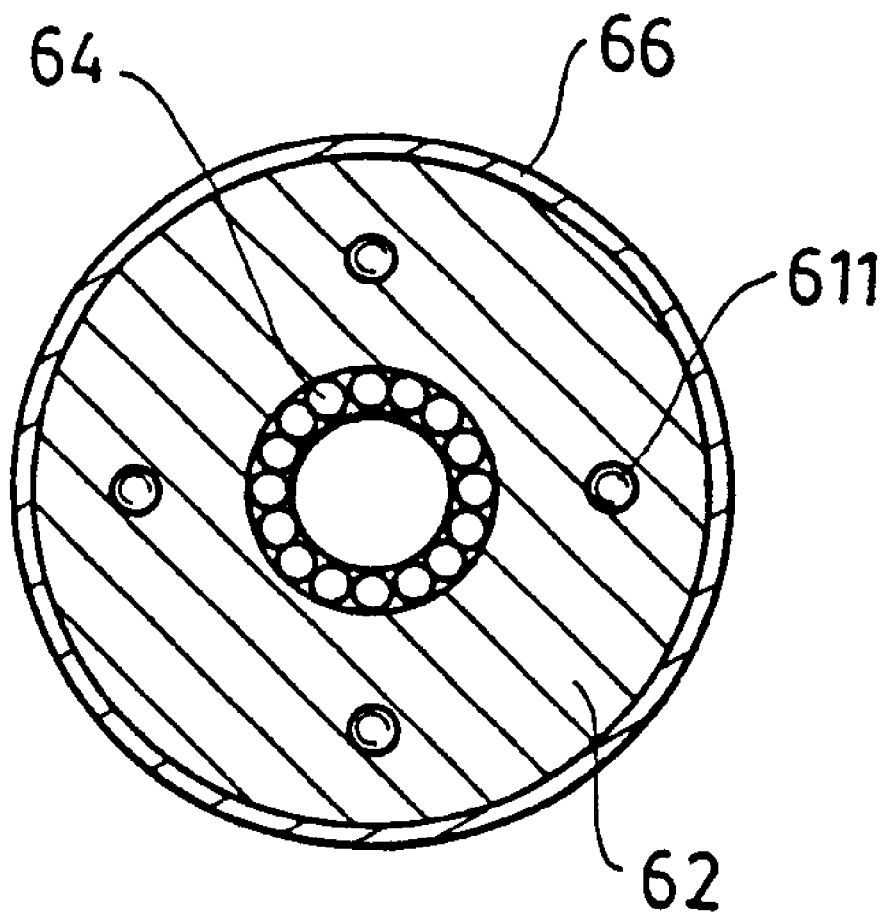
FIG. 6 is a schematic combination view of bolt circular cover, inner top circular block, the rotating-guiding bead, and the shaft bead of the improved structure of an electrical wheelchair in accordance with the present invention.

The vertical sensor 6 is substantially box-like structure having a circular cover 61 on the top thereof which is used to secure onto the bottom face of the support platform 21. As shown in FIGS. 4 to 6, the circular cover 61 is mounted with a plurality of bolts which mounts a circular block 62 to the bottom face, and the circular cover 61 and the center position corresponding to the circular block 62 is provided with a circular shaft hole 63 and the inner side of the hole is provided with a rotating bead 64 for the support of the shaft bead 651 at the top portion of the vertical swinging rod body 65, and the center of the bottom portion of the shaft bead 651 is extended with a swinging shaft body 652, and the bottom portion of the swinging rod body 652 is extended to form a circular impact body 653 of appropriate weight, and a cylindrical body 66 is connected to the circular cover 61, and the inner ring face is a plurality of carbon conductor 661 (about 8) which can be contact with the circular impact conductor 653. The automatic control of sensing power circuits are activated to proceed with front, rear, left, right, 15 degree of left front direction, and 75 degree of left front direction and 15 degree of right front direction.

The retractable leakage prevention is a cover made from a rubber material having soft texture and compressible such that the front-rear, left-right adjusting members 2, 3 and vertical sensor 6 is fully covered within the cover 7 and the parts of the wheelchairs are prevented from exposure to the external and the dust water is prevented from entering the wheelchairs.

Figure 7:
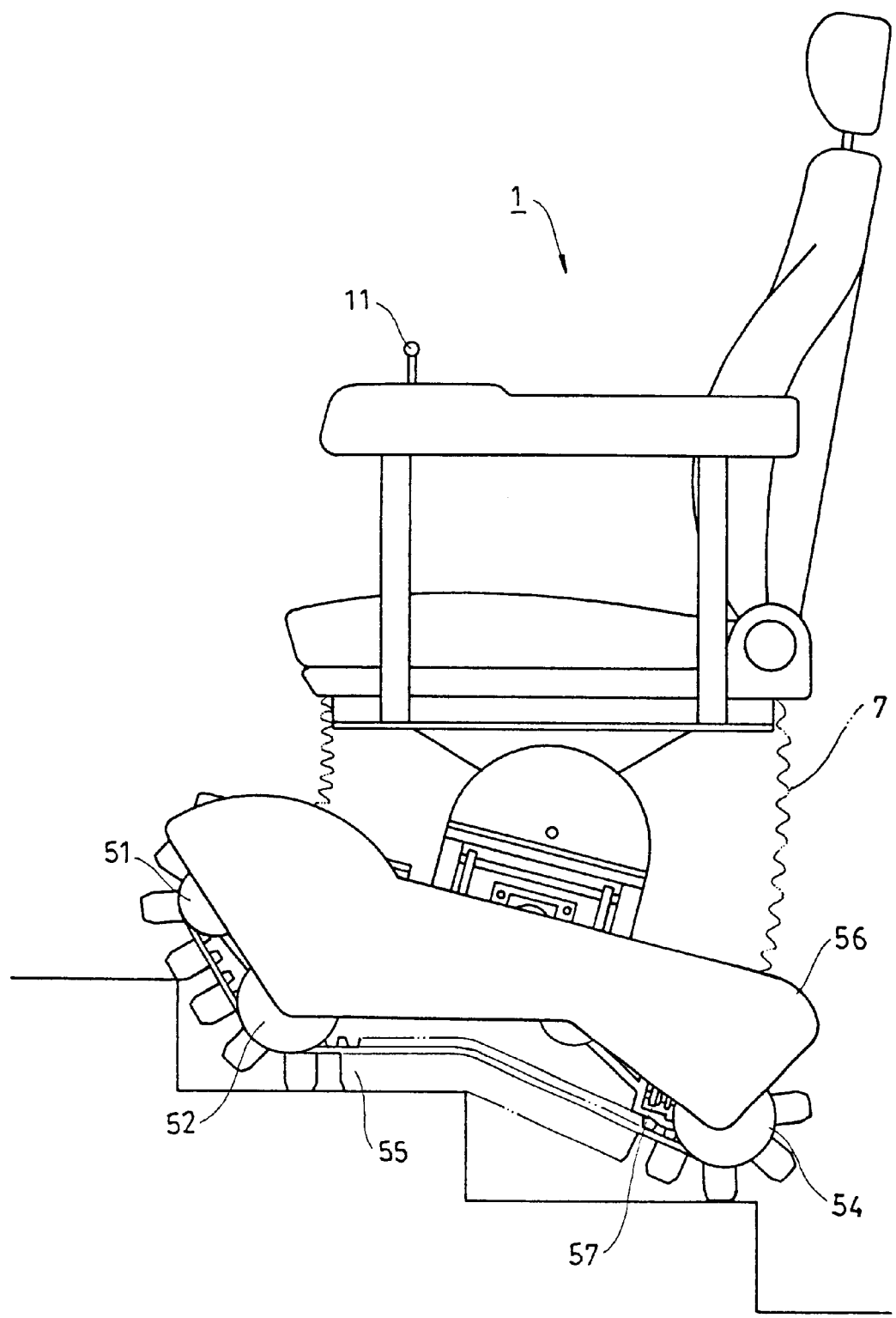
FIGS. 7 to 9 are sectional views showing the climbing action and moving down of steps of the improved structure of an electrical wheelchair in accordance with the present invention.
Figure 8:
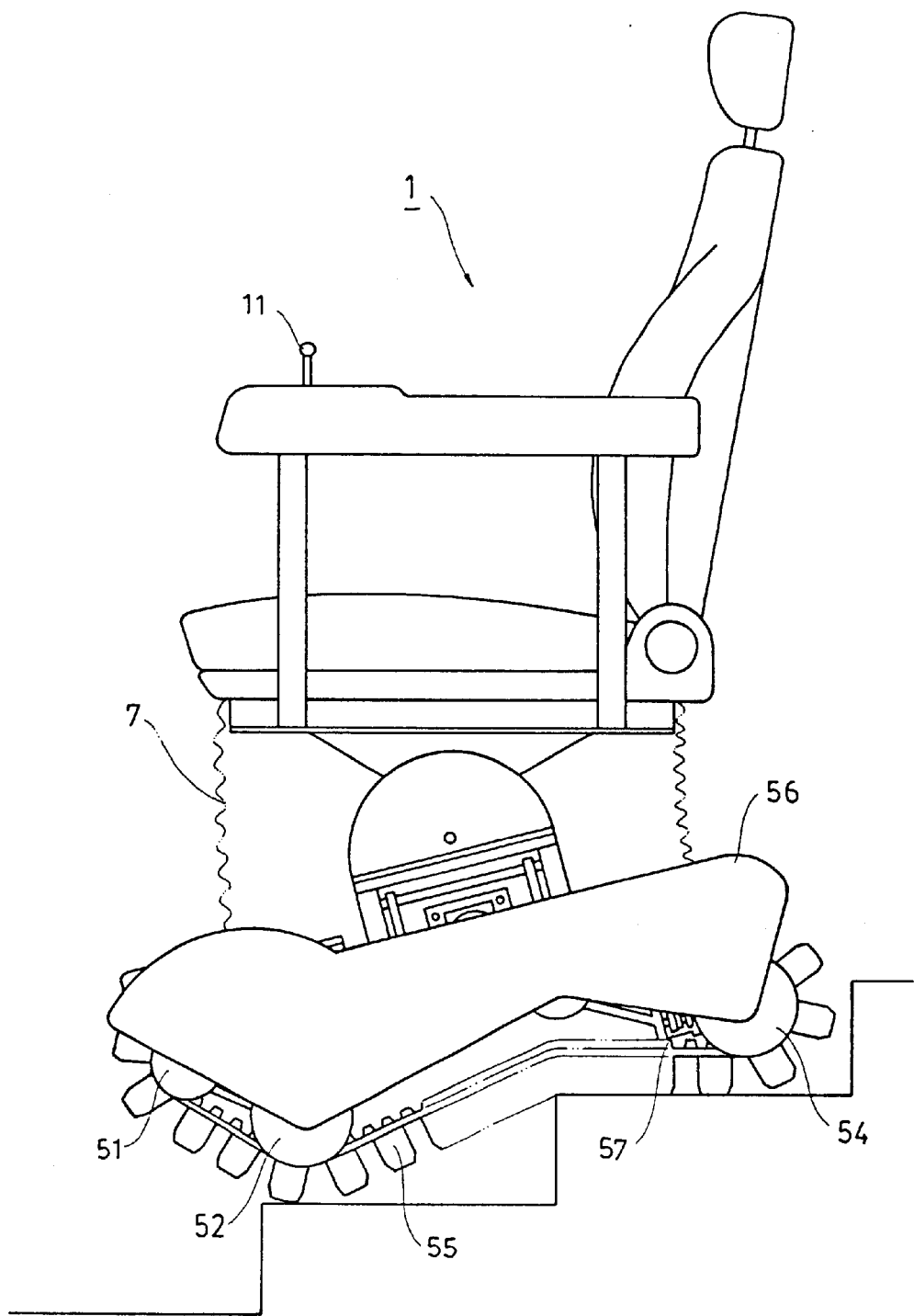
Figure 9:
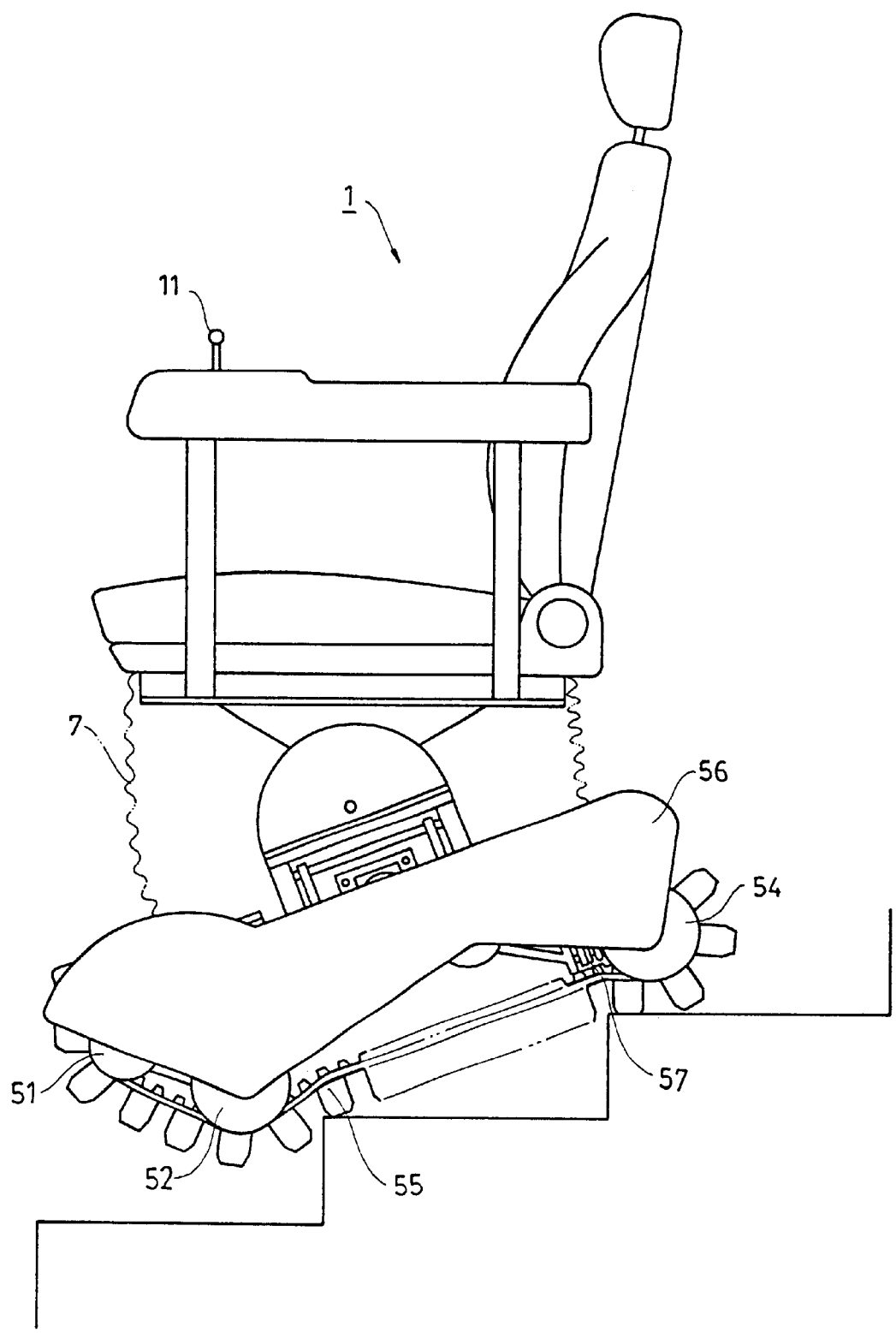

Referring to FIGS. 7, 8, 9, there are shown the wheelchair goes up a step or down a step or on a bumpy road. As shown in the Figures, the wheel belts module 5 allows the wheelchair to move upward of the steps at this moment, the vertical sensor 6 at the bottom of the supporting platform 21 will include backward, but the impact conductor 653 will maintain vertical and one or two of the carbon conductor 661 will contact with the impact conductor 653 and the automatic controlled sensing circuit is provided with current supply and the gear body 241 will move to-and-fro by the transmission of the small gear 232. Thus, the two directing boards 22, the supporting platform 21 and the seat 1 will move accordingly. When the vertical sensor 6 moves toward the impact conductor 653 but does not contact with the carbon conductor 661 (the seat is restored to its horizontal position), the automatic controlled sensing circuit will not sense the electrically conduction, and the speed-reducing motor 35 will not rotate. At this moment the seat 1 is maintained at a horizontal position. Referring to FIGS. 8 and 9, when the wheel belt module 5 moves down a step, the seat 1 will incline toward the front but at this time, the vertical sensor 6 will incline forward in accordance with the supporting platform 21 and the impact conductor 653 will contact with one or two of the carbon conductor 661 and the automatic control sensing circuit will sense the electrical conduction and drive the motor 23 to drive the small gear 37 to rotate backward. Thus the tow directing board 22, the supporting platform 21 and the seat 1 will move backward until the seat restores to its horizontal position.

Figure 10:
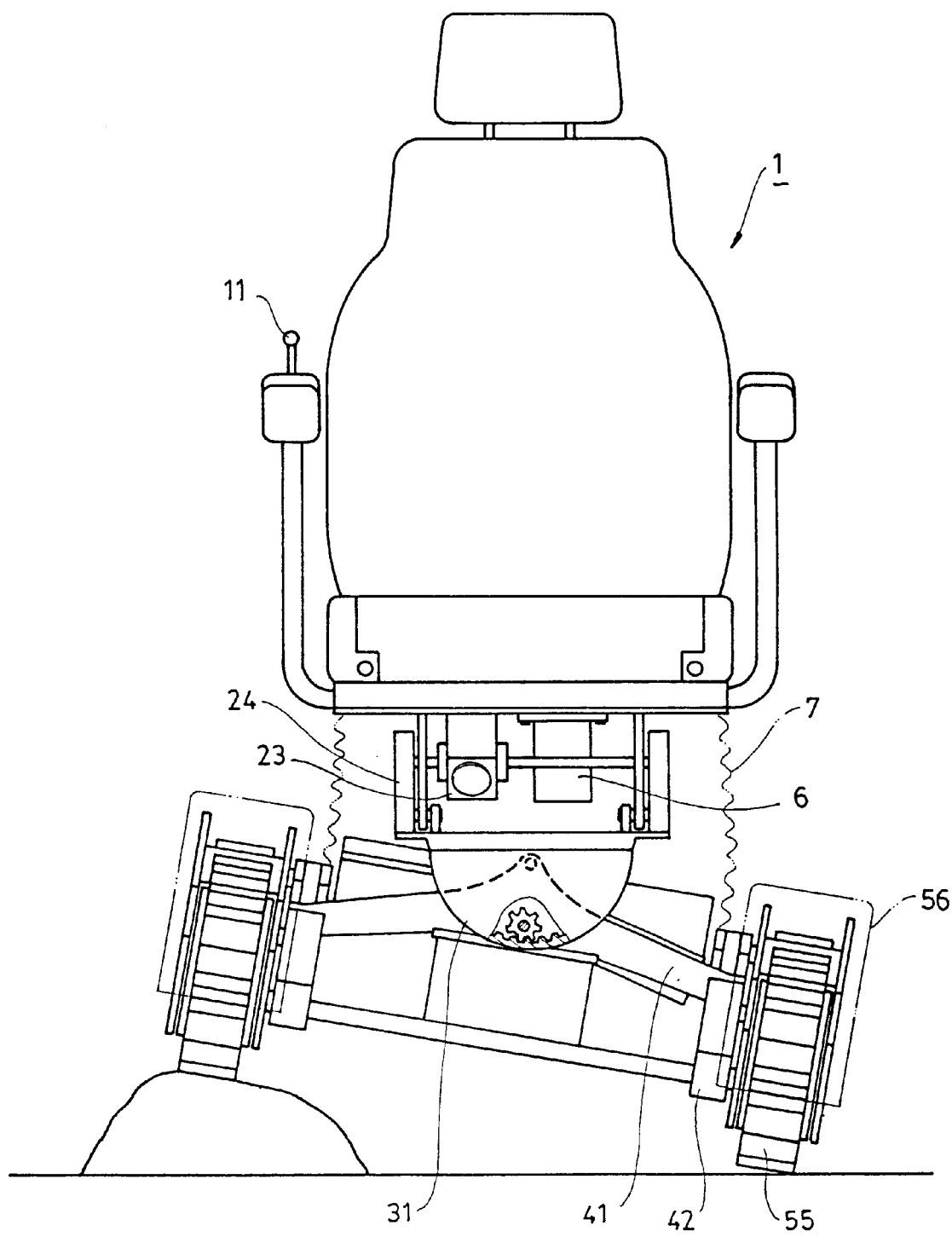
FIG. 10 is a sectional view of the improved structure of an electrical wheelchair moving on the ground with protruded blocks in accordance with the present invention.
Figure 11:
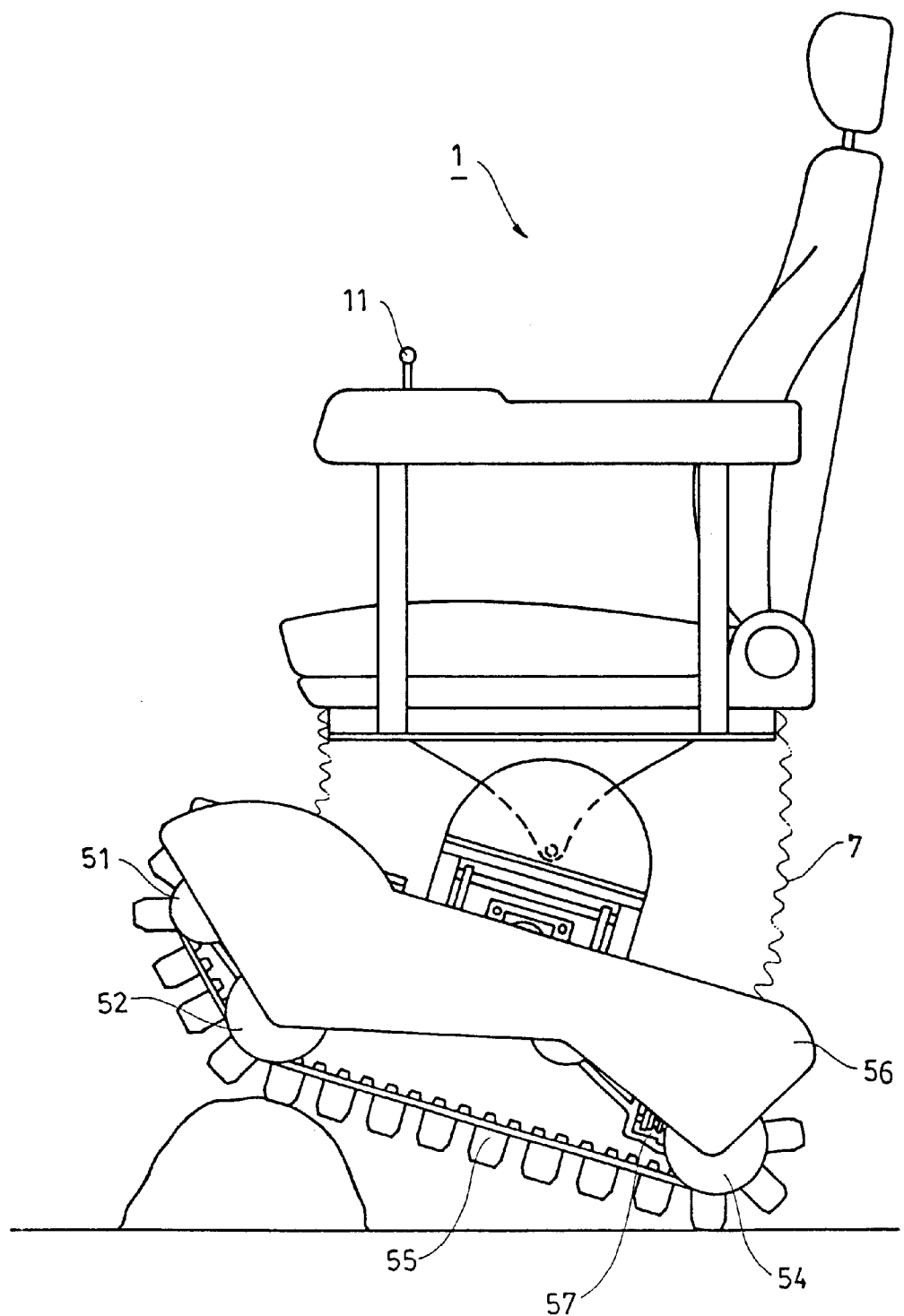
FIG. 11 is another sectional view of the improved structure of an electrical wheelchair moving on the ground with protruded blocks in accordance with the present invention.

In view of the above, the impact of the carbon conductor 661 with the impact conductor 653 to cause the automatic controlled sensing circuit to provide the adjustment of the inclined seat 1 to a horizontal position. In addition, as shown in FIGS. 10 and 11, the wheelchairs moves along a bumpy road or on a plurality of protruded blocks, the vertical sensor 6 will also sense the rear and right inclination and the impact conductor 653 to contact with one or two carbon conductors 661. The automatic controlled sensing circuit will sense the electrically conduction and the to-and-fro and left-and-right adjusting members 2,3 will act synchronously so that the seat 1 is appropriately adjusted to a horizontal position.

Although the invention has been explained in relation its preferred embodiment, it is to be understood that many other possible modifications and variations can be made without departing from the spirit and scope of the invention as hereinafter claimed.

I claim:

1. A structure of a wheelchair comprising:
   (a) a seat having a driving control rod mounted at a handrail of the wheelchair;
   (b) a to-and-fro adjusting device having a supporting platform mounted at a bottom section of the seat, a pair of directing boards protruded from a bottom of the device and having a hole for a transmission shaft of a speed-reducing motor, ends of the shaft being mounted with a rotating gear corresponding to a pair of rotating inner gear seats and in engagement with a gear body within the seat, a center of the gear seats being provided with a shaft hole corresponding to protruded lugs of a frame seat for mounting of a bolt such that two directing boards and the gear seats are interconnected, and a bottom section of the gear seat being mounted at two lateral sides of the frame seat, and another lateral side of a bottom face of the frame seat having a plurality of holes for securing of the two gear seats;
   (c) a left-right adjusting member having a pair of corresponding inner gear seats and a speed-reducing motor, a center region of the inner gear seats being a shaft hole corresponding to a rotating hole located at an H-shaped bottom middle-frame for insertion of a shaft rod such that the inner gear seats are located at an external face at a top of the bottom middle-frame, and the speed-reducing motor being located at a base board of the bottom middle frame, and the two ends of the transmission shaft being corresponding to a hole of two lateral sides of the bottom middle-frame, and the two ends being connected to another rotating small gear which is in engagement with the gear body of the inner gear seats;

(d) a base frame body for supporting weight of the wheelchair and having a center extended with the bottom middle-frame, an inner face corresponding to two lateral side frames being provided with a driving motor, and an external lateral face being connected to a belt module and the transmission shaft of the driving motor being respectively passed through the lateral side frames and connected to a transmission wheel;

(e) the belt module comprising the transmission wheel, a step-wheel, a stopping wheel, and a landing wheel, and a covering plate, and the transmission wheel being driven by the transmission shaft of the driving motor so as to drive the entire belt module, the step wheel being located at the side of the transmission wheel for the climbing of a plurality of steps, and the stopping wheel located at the side of the transmission wheel for stopping of the belt, and an inner side of the landing wheel being an adjusting member to drive displacement of the landing wheel so that tightness of the belt can be adjusted, and surface of the belt being provided with teeth face of appropriate width to facilitate climbing of steps or bumpy road, and a cover plate being used to prevent polluted water or stone or dust to collect on the seat;

(f) a vertical sensor substantially box-like structure having a circular cover on a top thereof which is used to secure onto a bottom face of the support platform, the circular cover being mounted with a plurality of bolts which mounts a circular block to a bottom face, and the circular cover and a center position corresponding to the circular block being provided with a circular shaft hole and an inner side of the hole being provided with a rotating bead for supporting a shaft circular bead at the top portion of a the vertical swinging rod body, and the center of the bottom portion of the shaft circular bead being extended with a swinging shaft body, and a bottom portion of the swinging rod body is extended to form a circular impact body of appropriate weight, and a cylindrical body being connected to the circular cover, and an inner ring face being a plurality of electrical conductor bodies which can be in contact with the circular impact conductor, thereby automatic control of sensing power circuits is activated to proceed with front, rear, left, right, 15 degree of left front direction, and 75 degree of left front direction and 15 degree of right front direction; and (g) a retractable anti leakage cover made from a rubber material having soft texture and compressible such that the front-rear, left-right adjusting member and vertical sensor being fully covered within the cover and parts of the wheelchairs being prevented from expose to external and dust and water being prevented from entering the wheelchair;

(h) thereby when the wheelchair goes up a step or down a step or on a bumpy road, the impact conductor within the vertical sensor which is in a vertical direction impacts with one or two carbon conductor bodies to automatically control a sensing circuit so that direction of the wheelchair is rapidly restore to a horizontal position.

2. A structure of a wheelchair as set forth in claim 1, wherein the directing inner gear seat of the to-and-fro adjusting member and the directing inner gear seat of the left and right adjusting member are mounted in opposite directions at the lateral side adjacent to the frame seat top and bottom surface.

3. A structure of a wheelchair as set forth in claim 1, wherein the speed-reducing motor of the to-and-fro adjusting member is screwed in between two directing boards at the bottom face of the supporting platform.

4. A structure of a wheelchair as set forth in claim 1, wherein the shaft bead of the vertical sensor and the carbon conductor are connected to the automatic control sensing circuit so that the impact conductor touching the carbon conductor provides an electrical conduction, causing the reducing motor of the to-and-fro adjusting member and the left-and-right adjusting motor to rotate.

5. A structure of a wheelchair as set forth in claim 1, wherein there are eight carbon conductor parts of the vertical sensor arranged in circular, such that the impact conductor provides a single or double impact and to provide electrical conduction for the automatic control sensing power source circuit for front, back, left, right and left-front 15 degree and left front 75 degree and right-back 45 degree direction.

* * * * *